United States Patent [19]
Hendler et al.

[11] 3,778,123

[45] Dec. 11, 1973

[54] LIQUID BEARING UNIT AND SEAL

[75] Inventors: Harvey S. Hendler, Wayne; William C. Albert, Boonton; John Evans, Oakland, all of N.J.

[73] Assignee: The Singer Company, Little Falls, N.J.

[22] Filed: Nov. 17, 1971

[21] Appl. No.: 199,619

[52] U.S. Cl.................. 308/36.3, 74/5 R, 277/135, 308/9
[51] Int. Cl. ............................................. F16c 33/72
[58] Field of Search...................... 308/36.3, 9, 122, 308/DIG. 1; 74/5; 277/135

[56] References Cited
UNITED STATES PATENTS

| | | | |
|---|---|---|---|
| 3,567,231 | 3/1971 | Albert | 277/135 |
| 3,420,583 | 1/1969 | Hirs | 308/9 |
| 2,980,473 | 4/1961 | Tanis | 308/161 |
| 3,502,342 | 3/1970 | Albert | 277/135 |
| 3,530,728 | 9/1970 | Evans et al. | 74/5 |
| 3,570,281 | 3/1971 | Albert | 308/9 |
| 3,657,931 | 4/1972 | Jacobson | 74/5 |
| 1,529,350 | 3/1925 | Emmet | 308/36.3 |
| 1,728,434 | 9/1929 | Montreuil | 308/36.3 |
| 2,166,405 | 7/1939 | Hait | 308/36.3 |

*Primary Examiner*—Charles J. Myhre
*Attorney*—S. A. Giarratana et al.

[57] ABSTRACT

A self-contained, hydrodynamic liquid bearing unit, or cartridge, is provided which has general utility, and which finds particular application in present day gyroscopes. The bearing cartridge of the invention, in the embodiment to be described, includes a journal member rotatably contained in a bore in a housing, and a layer of bearing fluid separating the journal member from the inner peripheral surface of the bore. Rotary seals of a non-wetting liquid, such as mercury, are provided at each end of the cartridge to segregate the bearing from the other elements of the instrument in which it is incorporated. When the liquid bearing cartridge of the invention is used in a gyroscope, for example, the rotor of the gyroscope is able to run in a stable vacuum with virtually no power losses due to windage effects.

10 Claims, 5 Drawing Figures

LIQUID BEARING UNIT AND SEAL

BACKGROUND OF THE INVENTION

The prior art ball bearing is presently in widespread use in a wide variety of different types of apparatus. However, when the prior art ball bearing is used in certain instruments, such as the present day gyroscope, for example, it constitutes a principal source of error torque which manifests itself as gyroscopic drift.

Specifically, the prior art ball bearings introduce vibrations into the gyroscope because of variations in the geometry of the balls and housing of the unit. These vibrations, in turn, exercise the g sensitivities of the gyroscope and introduce drift. Moreover, the dynamic reactions of the balls in the prior art ball bearing units impose erratic torques which increase in severity during the life of the instrument, and thereby tend to accelerate the wear-out process. The performance of many present day gyroscopes using ball bearings is influenced by windage torques which change in time as the vacuum around the gyroscopic rotor element becomes contaminated by lubricant vapors, and the like. The effect of the latter characteristic is to delay the warm-up capabilities of the gyroscope equipped with the prior art ball bearings, and to promote long term instability. As will be described, the improved liquid bearing cartridge of the present invention uses shaft seals of a non-wetting liquid, such as mercury, so that the windage effects are minimized, as is the possibility of contamination by lubricant vapors.

The self-contained hydrodynamic liquid bearing cartridge of the present invention, unlike the prior art ball bearing, does not contain any vibration-producing rolling elements, and mechanical noise is thereby reduced to a minimum. This reduction of mechanical noise results in a significant improvement in the performance of the gyroscope using the liquid bearing of the invention, because mechanical noise from the spin bearing of the gyroscope is a principal source of random erratic operation thereof.

The low mechanical noise level characteristic of the self-contained hydrodynamic liquid bearing cartridge of the present invention, together with its inherently efficient lubrication capabilities, results in superior operational life characteristics, as compared with the usual prior art ball bearings. Moreover, because the liquid bearing cartridge of the present invention does not require high viscosity ball bearing lubricant oil, there are no starting problems at low temperatures of the instruments in which the bearing is used, and start-up wear effects are reduced, as compared with the prior art ball bearings. The start-up characteristics of the instrument using the liquid bearing of the present invention are even superior to those using pure gas bearings, this being due to the presence of incompressible liquid lubricant in the bearing of the invention.

As mentioned above, when the liquid bearing cartridge of the present invention is used in a gyroscope, the rotating seals of non-wettable liquid, such as mercury, which segregate the gyroscopic element from the motor bearing assembly, permit the gyroscopic element to run in a stable vacuum with virtually no power losses due to windage effects. The stability of the vacuum when the unit of the present invention is used is not limited by vapor pressure of the bearing lubricant, as is the case when the prior art ball bearing is used. The bearing unit of the present invention is, therefore, particularly suited for low vacuum environment.

The rotating liquid seal used in the bearing cartridge of the present invention is similar in some respects to the rotary liquid seal described in U.S. Pat. No. 3,567,231, which was filed in the name of William C. Albert, and which is assigned to the present assignee. Other prior art rotary seal techniques for use in a vacuum environment, such as O-ring packing seals, require large power sources to overcome the torque generated by the resulting rubbing friction. Still other prior art rotary vacuum sealing techniques, such as described by Courtney, Levelle, of Britton and Denholm, in an article entitled "Sealing Techniques For Rotary In Vacuum", appearing at page 21 in the February 1964 issue of "Astronautics and Aeronautics," are complex and have limited application. The bearing cartridge of the present invention, on the other hand, is simple and uncomplicated, and is relatively small in size, and in which friction losses are maintained at a minimum.

As an additional feature, the liquid bearing cartridge of the invention, in the embodiment to be described, is constructed to eliminate the need for the usual resilient bellows element which normally is used in the prior art to take care of changes in the volume of the contained liquid as the ambient temperature changes. Such liquid volume changes are taken care of in the unit to be described by the provision of an air pocket within the bearing cartridge cavity. This air pocket takes up any expansion of the bearing liquid as the temperature increases. The provision of such an air pocket has the advantage of permitting the size of the bearing cartridge to be maintained at a minimum.

The liquid film within the bearing cartridge of the present invention may be extremely thin. For example, the film may have a thickness of the order of 0.00025 inches. Moreover, since the film has a relatively large contact area, the thermal conductivity through the film is high, so that the creation of high thermal gradients within the bearing is prevented.

DETAILED DESCRIPTION OF THE ILLUSTRATED EMBODIMENT

Figure 1:
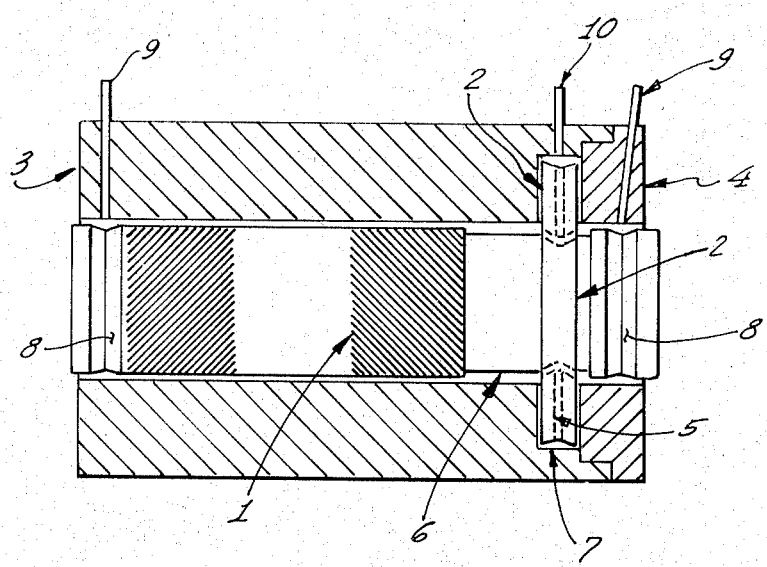
FIG. 1 is a side section of a bearing cartridge constructed in accordance with the concepts of the invention.

The self-contained hydrodynamic liquid bearing cartridge illustrated in FIG. 1 includes a journal member 1, and a double acting thrust bearing disc-shaped plate 2 mounted at one end of the journal member. Both the journal member 1 and the thrust bearing 2 are rotatably enclosed within the bore of a housing 3, and are held in the bore of the housing by means of an apertured end cap 4. The journal member 1, for reasons to be explained, has a spirally grooved segmented peripheral surface. For the same reason, the thrust bearing 2 has a partially grooved surface.

Both the journal member 1 and the thrust bearing 2 are preferably coated with a wear-resistant coating. For example, flame sprayed wear-resistant coatings, such as tungsten carbide, may be utilized. With such a coating, bearing wear is practically non-existent, even during stops and starts of the instrument in which the bearing is used. Capillary action tends to keep the smaller gaps of the bearing filled with liquid at all times, even when it is dormant and not rotating. Therefore, the bearing is always ready for instantaneous starts.

Recesses are provided for permitting the expansion of the liquid in the bearing, these recesses being provided by a series of radial passages 5 (FIG. 1) formed in the thrust bearing 2, and/or by providing a recessed portion 6 at the right hand end of the journal member 1. A V-shaped groove 7 is provided around the periphery of the thrust bearing 2, and this groove functions as a collector so that centrifugal forces acting on the higher density liquid surrounding the members 1 and 2 force a vapor bubble into the reservoir formed by the radial passages 5.

A bearing fluid fill port 10 is provided, and the region between the journal member 1 and the inner surface of the bore of the housing 3 is filled with a bearing fluid. This bearing fluid preferably is of low viscosity, low vapor pressure fluid, such as 1-octene. The rotating gap seals, which are formed of a non-wettable liquid such as mercury, are located at both ends of the bearing cartridge in the peripheral V-grooves 8 in the journal member 1, the liquid seal fill ports being designated 9 in FIGS. 1 and 2.

Figure 2:
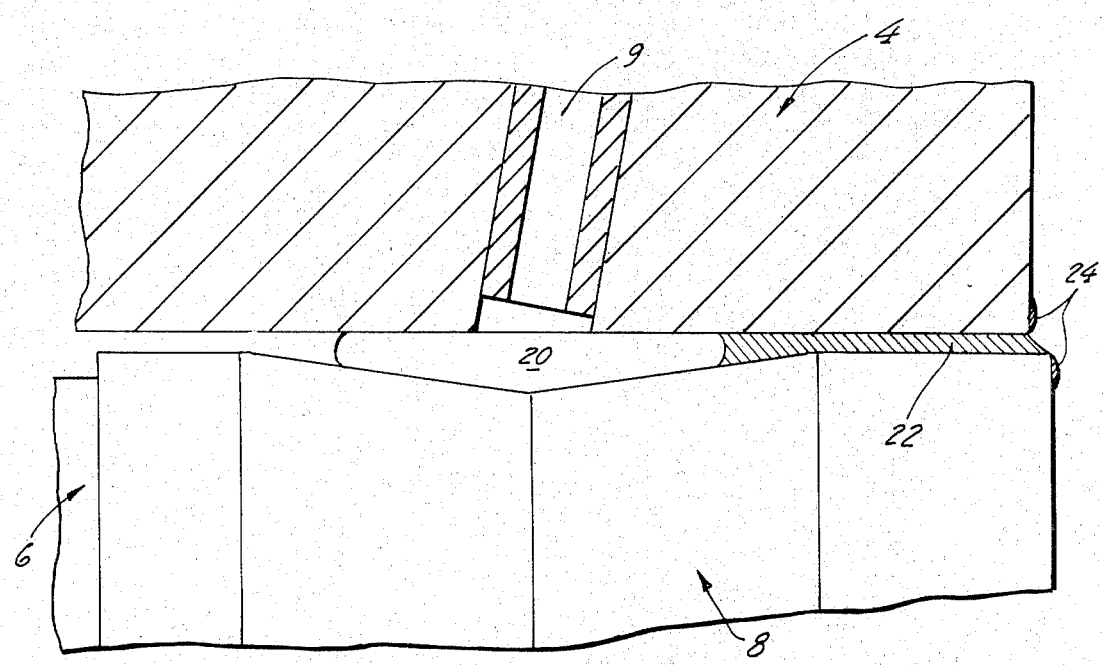
FIG. 2 is an enlarged fragmentary section of a portion of the assembly of FIG. 1, and illustrating particularly the seal formed by the non-wettable liquid, such as mercury.

FIG. 2 is an enlarged representation of the rotating seal which, as mentioned above, is located at each end of the bearing cartridge of FIG. 1. The annular region 20 between the groove 8 and the inner surface of the bore of the aperture in the end cap 4 is filled with a non-wetting liquid, such as mercury. This liquid provides an annular ring surrounding the V-groove 8 in the journal member 1. In addition, a thin film of low vapor pressure vacuum pump oil 22 may be provided in the annular space between the end of the journal member and the inner surface of the aperture in the end cap 4. This latter film is positioned immediately adjacent to the mercury seal in order to retain the mercury in the annular region 20. A pair of thin barrier films 24 are provided at the edges, as shown, to prevent the oil from spreading as a result of surface effects. The thin film barrier members 24 are formed of a suitable material which exhibits low surface energy. This material serves to inhibit the aforesaid spreading action. Such materials are available under the tradename Nyebar.

The stability of the bearing unit of FIG. 1 is enhanced by the provision of the spirally grooved segmented surface on the journal member 1, as shown, and by the aforesaid partially grooved surface of the thrust bearing 2. Although the journal member 1 with a smooth peripheral surface does have excellent load capacity, the resulting bearing suffers from a tendency towards instability. This is due to a property of the liquid journal bearing known as "attitude angle," and which is the angle between load and deflection. For lightly loaded ungrooved journal bearings similar to the type shown in FIG. 1, the attitude angle is 90°, but as the load increases, the attitude angle gets smaller. As a result, the journal member 1 is not restored to a null position when it is slightly deflected, but instead, its axis tends to rotate about the journal axis with a tendency to cause failure.

A simple technique for enhancing bearing stability is utilized in the bearing shown in FIG. 1 by the spiral grooves which are etched into the surface of the journal bearing. The resulting spiral grooved surface of the journal member 1 acts as a viscous compressor and its compression capacity is proportional to the linear sliding speed of the liquid in the space between the journal member and the inner surface of the bore of the housing. By reducing the flow induced by the viscous compressor, a pressure rise is maintained which forms a load carrying capacity. This flow reduction is accomplished by capillary seals on the non-grooved portion of the journal member which restrict the flow. A partial grooving with a narrow band of ungrooved surface, such as shown in FIG. 1, is optimum for the journal member. The resulting journal bearings have an attitude angle of 50°, and even when lightly loaded, a large, true restoring force exists, thereby suppressing "whirl." The thrust plate 2 may be partially grooved, as mentioned above, so that it may operate under the same principle.

The bearing cartridge of FIG. 1 is filled, for example, with a low viscosity and high boiling point liquid known to the art as, for example, 1-octene. The low viscosity of the liquid serves to retard friction, and the high boiling point, which is of the order of 120° C, serves to avoid large pressure variations during temperature cycling. To retain the low viscosity fluid in the bearing, the aforesaid rotary seals are used, and which make use of the high surface tension and non-wetting characteristics of liquid metal, such as mercury. The action of the seals may best be explained with reference to FIGS. 3 and 4, and in which FIG. 3 represents the accommodating angle condition of the seal, whereas FIG. 4 represents the accommodating width condition.

Figure 3:
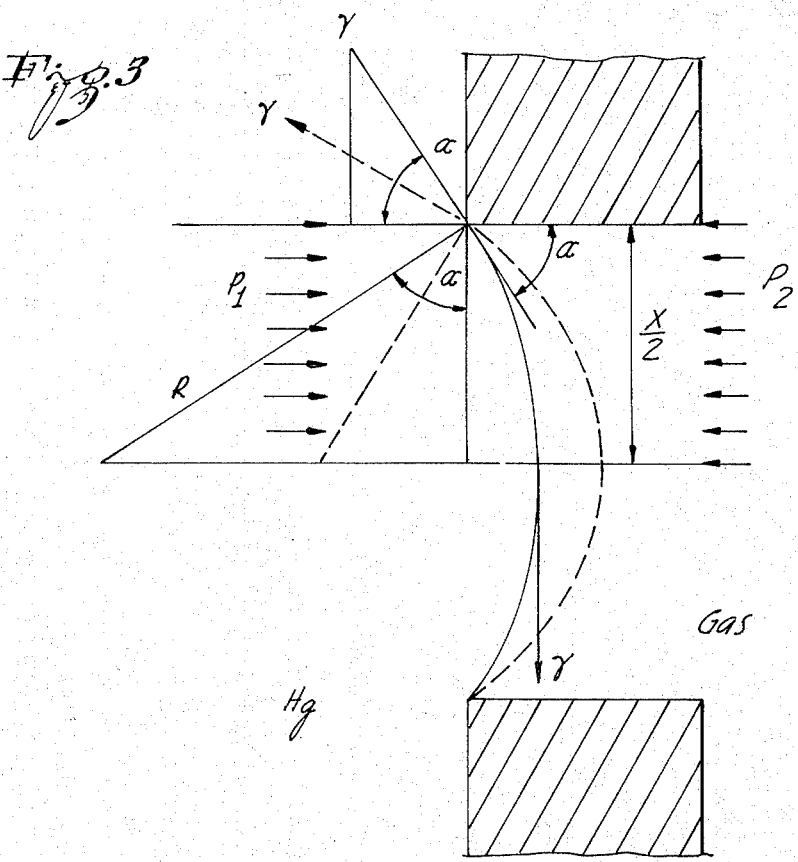
FIGS. 3 and 4 are curves useful in explaining the operation of the liquid bearing cartridge of the invention.
Figure 4:
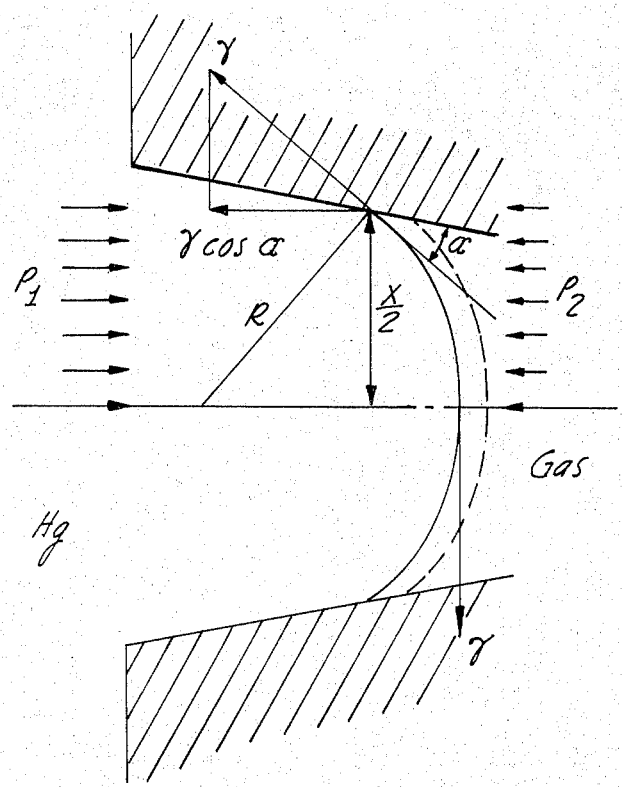

For example, FIG. 3 represents a high surface tension liquid, such as mercury, attempting to enter a small opening. Because the liquid pressure is greater than the gas pressure, the resulting bulge will take on the illustrated configuration. The following expression describes the equilibrium conditions for a slit-like opening of unity depth into the plane of the drawing:

$$\Delta PR \cos \alpha = \gamma \cos \alpha \qquad (1)$$

Where:
$\Delta P = P_1 - P_2$ The pressure differential across the liquid-gas interface.
$\gamma$ = Surface tension of the liquid.
$\alpha$ = Contact angle.
$R$ = Radius of curvature.

Substituting $x/2$ for $R \cos \alpha$, and re-arranging, we get:

$$\Delta P = 2 \gamma \cos \alpha / x \qquad (2)$$

Referring to FIG. 3, and to Equation (2), $\gamma$ and $x$ are constants and as $\Delta P$ increases, $\cos \alpha$ must increase and, therefore, $\alpha$ must decrease. This effect, as shown by the broken line in FIG. 3, is the accommodating angle condition, and $\alpha$ will decrease until the minimum contact angle is reached. The value of the minimum contact angle, and most materials with which it contacts but does not react, is about 40°. If an angle less than 40° is called for, equilibrium cannot be obtained, and the mercury in this case will flow through the slit.

FIG. 4 shows a similar condition where the mercury of the rotary seal has entered a slit of decreasing width. Because the mercury would advance in the slit, the minimum contact angle is subsequently reached and maintained. Referring to FIG. 4, and to Equation (2), $\gamma$ and $\alpha$ are now constants, and as $\Delta P$ increases, $x$ must decrease. The interface will then move into the slit to a point where equilibrium conditions are reached, that point representing the accommodating gap condition.

The seal shown in FIG. 2 is based on the accommodating gap condition. The seal geometry is such that accommodations are made for the seal expansion of the mercury. The seal dissipates negligible power due to viscous shear effect.

The thin film 22 of low pressure oil is deposited at both seals, as described above, and as shown in FIG. 2, in order to prevent the mercury from vaporizing at low pressures. As also described, in order to prevent the oil of the film 22 from migrating out of the barrier gap, barrier films 24 are provided which may be formed, for example, of a liquid known as Nyebar. As is well known, liquids will spread upon or "wet" any surface whose surface energy is higher than that of the liquid. Therefore, because of the very high surface energies of metals, liquids are normally expected to spread or creep across any truly clean metal surface. However, by modifying the surface of the metal with a stable, permanent film of low surface energy, it is possible to retard the migration of liquids across that surface.

As mentioned above, the barrier films 24 may be formed of Nyebar, which is a flurocarbon polymer with a surface energy at room temperature well below the surface tension of all known lubricating fluids. The Nyebar polymers are supplied as a solution in a fast evaporating fluorinated or chlorinated carrier solvent. At room temperature, the films 24, remaining after evaporation of the solvent, serve to retard spreading or creep of the oil across the film surface. The surface tension of the oil in the film 22 will decrease with increase in temperature.

At a certain temperature level, the surface tension of the oil will equal or drop below the surface tension of the Nyebar films 24, and this latter temperature limits the maximum effective use of the films 24 with respect to the associated films 22. For example, the surface tension of the oil forming the film 22 normally reaches the surface tension of the Nyebar film at 400° F, which is well above the normal operating condition of present day gyroscopes, for example, which is of the order of 140° F. Therefore, Nyebar is a satisfactory material for use in forming the films 24, when the bearing unit is to be used in a present day gyroscope.

As mentioned above, in order to eliminate the need for a conventional bellows unit, the interior of the bearing of FIG. 1 is intentionally not filled to capacity. Since the expansion rate of the fluid and the desired temperature range over which the bearing unit is to be operated are known, as well as the range of tolerable pressures, the bubble volume may be readily calculated from Charles Law: $P_1 V_1 / T_1 = P_2 V_2 / T_2$ (3)

The size of the bubble is typically 10 to 50 percent of the total volume. The bubble size is maintained small so that a sufficient amount of liquid may be present in the bearing to provide pumping action for the bearing load capacity. The bubbles are forced into the radial passages 5 in the thrust plate 7, due to centrifugal forces as the journal member and thrust plate rotate, and do not migrate into the running gap. As the temperature increases, the liquid expands and ultimately displaces the bubble with liquid.

Figure 5:
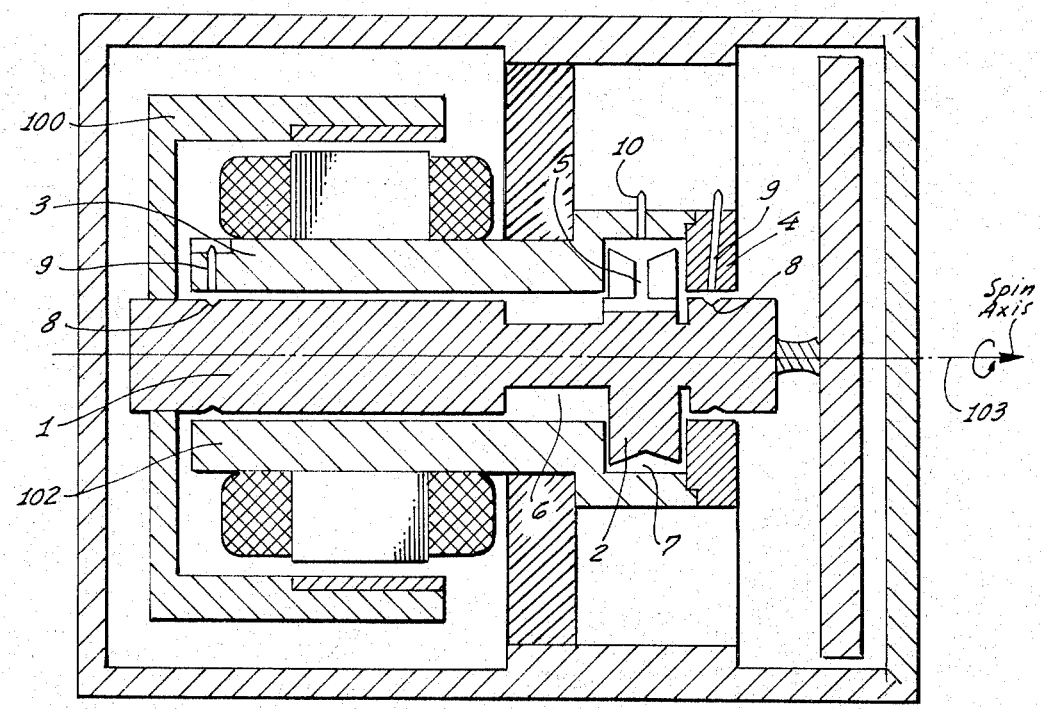
FIG. 5 is a side section showing a present day gyroscope in which a liquid bearing cartridge embodying the invention is included.

As mentioned above, the representation of FIG. 5 shows a liquid bearing cartridge which may be constructed in accordance with the concepts of the invention, as used in a present day gyroscope. In the gyroscope of FIG. 5, a torque motor designated 100 produces rotation of a rotor 102 about a spin axis 103. The rotor 102 supports the usual gyroscopic elements, which need not be described herein. The rotor of the gyroscope is supported for rotation about the pin axis by a liquid bearing unit which, in the illustration, is constructed in a manner similar to that shown in FIG. 1, and in which the same numerals are used to indicate like elements.

It will be appreciated that although a particular type of bearing cartridge has been shown and described, the concepts of the self-contained bearing of the present invention may be applied to other types of bearing configurations. For example, conical, opposed hemisphere and spherically hydrodynamic bearings may also be constructed as self-contained cartridges, utilizing the bubble concepts and rotary shaft seals described above. Moreover, the rotary mercury seals described above as of the ring type, may also be used as a face type seal between two flat surfaces. Also, the bearing medium need not necessarily be a liquid, as any fluid, including a gas, may be used.

Therefore, while a particular embodiment of the liquid bearing of the invention has been shown and described, modifications may be made. It is intended to cover all such modifications which fall within the spirit and scope of the invention, in the following claims.

We claim:

1. A fluid bearing unit including:
   a housing;
   a rotatable member encased within said housing and protruding through an opening in at least one end of said housing;
   a film of fluid interposed between the rotatable member and the inner surface of said housing, said rotatable member having at least one cavity therein forming an air pocket, said fluid forming a bubble extending into said air pocket so as to permit expansion and contraction of said fluid in the presence of changes in ambient conditions; and
   a seal of non-wettable liquid material interposed between the protruding end of said rotatable member and the inner surface of the bore of said opening.

2. The fluid bearing unit defined in claim 1, in which said rotatable member includes an elongated cylindrical-shaped journal member and a disc-shaped thrust plate mounted at one end of said journal member.

3. A fluid bearing unit including:
   a housing;
   a rotatable member encased within said housing and protruding through an opening in at least one end of said housing, said rotatable member including an elongated cylindrical-shaped journal member and a disc-shaped thrust plate mounted at one end of said journal member;
   a film of fluid interposed between the rotatable member and the inner surface of said housing; and
   a seal of non-wettable liquid material interposed between the protruding end of said rotatable member and the inner surface of the bore of said opening, in which said thrust plate has a peripheral V-shaped groove and at least one passage extending radially inwardly from said groove, said fluid forming a bubble extending into said passage so as to permit expansion and contraction of said fluid in the presence of changes in ambient conditions, and said groove serving by centrifugal action to collect said bubble and drive it into said passage towards said journal member.

4. A fluid bearing unit including:
a housing;
a rotatable member encased within said housing and protruding through an opening in at least one end of said housing;
a film of fluid interposed between the rotatable member and the inner surface of said housing; and
a seal of non-wettable liquid material interposed between the protruding end of said rotatable member of the inner surface of the bore of said opening, a coating of low vapor pressure lubricant adjacent said non-wettable liquid and extending over a portion of the surface of said bore and over a portion of said protruding end to retard vaporization of said non-wettable material, and which includes barrier films applied to said housing and to said protruding end of said rotatable member adjacent said low vapor pressure coating to contain said coating and to prevent the migration thereof.

5. The fluid bearing unit defined in claim 4, in which said barrier film is composed of a liquid Nyebar flurocarbon polymer.

6. In a fluid bearing unit, or the like, the combination of:
first and second members supported for rotary movement with respect to one another;
a film of fluid interposed between said first and second members; at least one of said members having a cavity therein forming an air pocket, and said fluid having a bubble extending into said air pocket so as to permit expansion and contraction of said fluid in the presence of changes in ambient conditions.

7. The combination defined in claim 6, in which one of said members comprises a housing, and the other of said members is rotatably encased in said housing.

8. The combination defined in claim 7, in which said last-named member comprises a cylindrical-shaped journal member and a disc-shaped thrust bearing plate mounted on said cylindrical journal member, said thrust plate having at least one passage therein forming said cavity, and having a peripheral V-shaped groove thereon for collecting said bubble and for driving said bubble into said passage as said thrust bearing and said journal member rotate.

9. The combination defined in claim 8 wherein said fluid is of low viscosity and low vapor pressure.

10. The combination in claim 9 wherein said fluid is 1-octene.

* * * * *